UNITED STATES PATENT OFFICE.

AUGUST C. WUERPEL, OF TAMPA, FLORIDA.

COMPOSITION FOR PRESERVING ORANGES.

SPECIFICATION forming part of Letters Patent No. 413,249, dated October 22, 1889.

Application filed May 24, 1889. Serial No. 311,999. (No specimens.)

*To all whom it may concern:*

Be it known that I, AUGUST C. WUERPEL, a citizen of the United States, residing at Tampa, in the county of Hillsborough, in the State of Florida, have invented a new and useful composition of matter to be used in removing the acid from the rinds of oranges, thereby closing the pores of the rinds, and thus making the rinds impervious to the atmosphere and thereby preventing the oranges from rotting, of which the following is a specification.

My composition consists of the following ingredients: pure water, forty-five parts; slaked or unslaked lime, fifty parts; flour of sulphur, twenty-five parts; spirits of ammonia, twenty parts; bicarbonate of soda, twenty-five parts; alum, ten parts; alcohol, twenty-five parts. These ingredients should be made into a bath, well mixed, and heated to a temperature of from 100° to 150° Fahrenheit. The proportion of the ingredients should be slightly altered, according as to whether the oranges to be treated are thick or thin skinned.

In using the above-named composition the oranges should be dipped therein and allowed to remain about ten minutes, after which they should be taken out, and then may be immediately packed.

By using the above composition the acid in the rinds is removed. The pores of the rinds are thereby filled up, thus rendered impervious to the atmosphere, and are thereby prevented from rotting.

What I claim, and desire to secure by Letters Patent of the United States, is—

The herein-described composition of matter, to be used for removing the acid from the rinds of oranges and preventing them from rotting, consisting of water, alcohol, slaked or unslaked lime, flour of sulphur, spirits of ammonia, bicarbonate of soda, and alum, in the proportion specified.

AUGUST C. WUERPEL.

Witnesses:
ED. CANNY,
MORRIS G. WUERPEL.